US012773937B2

(12) United States Patent
Kasperczyk et al.

(10) Patent No.: US 12,773,937 B2
(45) Date of Patent: Oct. 27, 2026

(54) LASER-WELDED CONDUIT ON INFLATABLE BLADDER CARRIER

(71) Applicant: LEAR CORPORATION, Southfield, MI (US)

(72) Inventors: Grzegorz Kasperczyk, Warsaw (PL); Samuel Blair, Rochester, MI (US); David Abdella, Farmington, MI (US)

(73) Assignee: LEAR CORPORATION, Southfield, MI (US)

( * ) Notice: Subject to any disclaimer, the term of this patent is extended or adjusted under 35 U.S.C. 154(b) by 50 days.

(21) Appl. No.: 18/758,541

(22) Filed: Jun. 28, 2024

(65) Prior Publication Data

US 2026/0001469 A1 Jan. 1, 2026

(51) Int. Cl.

*B29C 65/00* (2006.01)
*B29C 65/16* (2006.01)
*B60N 2/90* (2018.01)
*B29L 22/02* (2006.01)
*B29L 23/00* (2006.01)

(52) U.S. Cl.

CPC .......... *B60N 2/914* (2018.02); *B29C 65/1635* (2013.01); *B29C 65/1677* (2013.01); *B29C 65/16* (2013.01); *B29C 65/1638* (2013.01); *B29L 2022/025* (2013.01); *B29L 2023/005* (2013.01)

(58) Field of Classification Search

CPC . B29C 65/16; B29C 65/1635; B29C 65/1638; B29C 65/1658

See application file for complete search history.

(56) References Cited

U.S. PATENT DOCUMENTS

| | | | | | |
|---|---|---|---|---|---|
| 6,086,041 | A | 7/2000 | Gattuso et al. | | |
| 2002/0056709 | A1 * | 5/2002 | Burt | B60N 2/914 | 219/202 |
| 2003/0030319 | A1 * | 2/2003 | Clapper | A47C 4/54 | 297/452.41 |
| 2012/0280554 | A1 * | 11/2012 | Brncick | B60N 2/64 | 297/452.41 |
| 2021/0162679 | A1 | 6/2021 | Kihara et al. | | |

FOREIGN PATENT DOCUMENTS

| | | |
|---|---|---|
| CN | 220483149 | 2/2024 |
| WO | 9845633 | 10/1998 |

OTHER PUBLICATIONS

European Search Report for European Patent Application No. 25150022.9 mailed Jun. 25, 2025.

Notice of Reasons for Rejection for Japanese Patent Application No. 2025-103841 mailed Aug. 28, 2026. [English translation].

* cited by examiner

*Primary Examiner* — Philip C Tucker
*Assistant Examiner* — Nickolas R Harm
(74) *Attorney, Agent, or Firm* — Carlson, Gaskey & Olds, P.C.

(57) ABSTRACT

A method includes arranging at least one laser-weldable conduit along a contact interface with a laser-weldable polymer film layer of a seat inflatable bladder carrier, directing a laser beam at the laser-weldable polymer film layer, and moving the laser beam along a welding path that intersects the contact interface. The laser beam penetrates through the laser-weldable polymer film layer and impinges the at least one laser-weldable conduit. The laser beam causes localized heating and welding along the weld path at the contact interface, to fuse the laser-weldable polymer film layer and the conduit together.

17 Claims, 4 Drawing Sheets

LASER-WELDED CONDUIT ON INFLATABLE BLADDER CARRIER

BACKGROUND

Automobile seats may include a massage assembly that has inflatable cells or bladders. The bladders are connected via fluid supply lines to a valve arrangement. A pump provides air to the valve arrangement, which directs the air to the bladders to be inflated. The bladders may be inflated and deflated in a sequence to provide a desired massage effect to the seat occupant.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
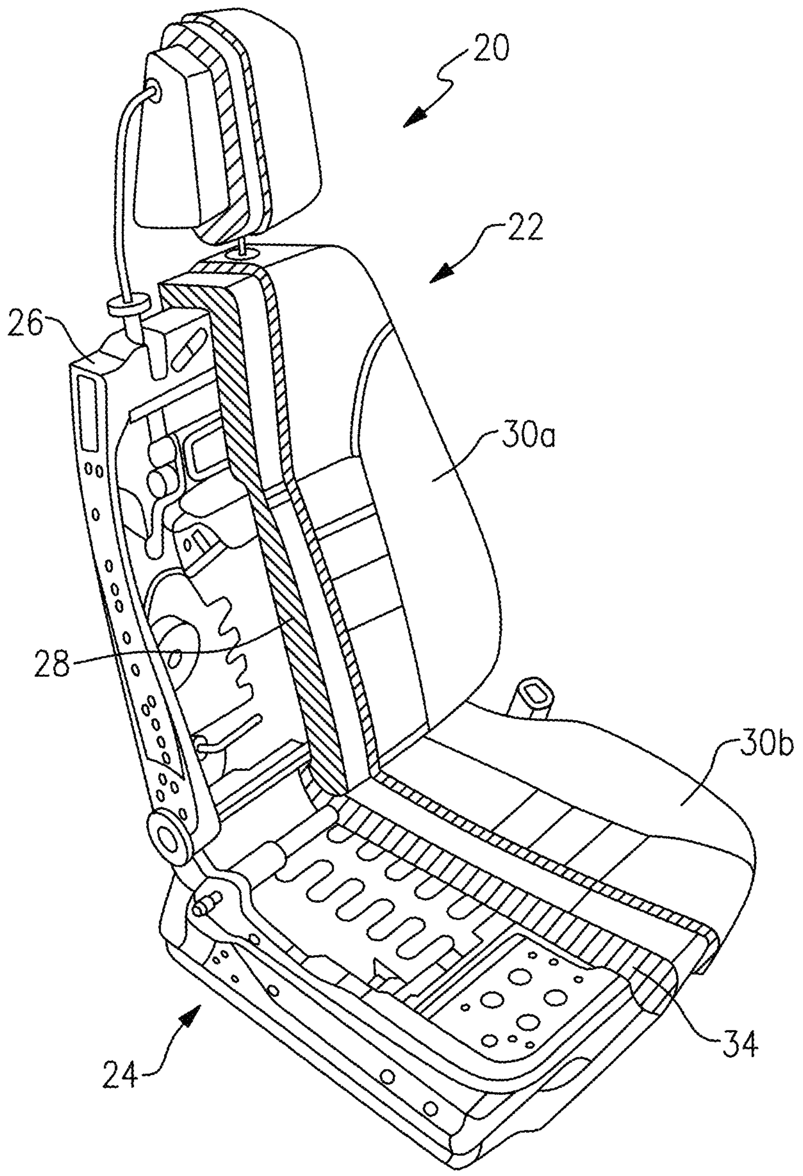
FIG. 1 illustrates a seat for an automobile.

FIG. 1 illustrates an example seat 20 for an automobile. In this example, the seat 20 includes a seat back 22 and a seat base 24. A seat frame 26 supports a cushion 28 in the seat back 22, which is covered by trim 30*a*. In the seat base 24, the frame 26 supports a bottom seat cushion 34, which is covered by seat trim 30*b*. Although the example seat 20 is for an automobile, it is to be understood that the examples are applicable to other types of vehicles, such as but not limited to, a motorcycle, a watercraft, an aircraft, or a locomotive.

Figure 2:
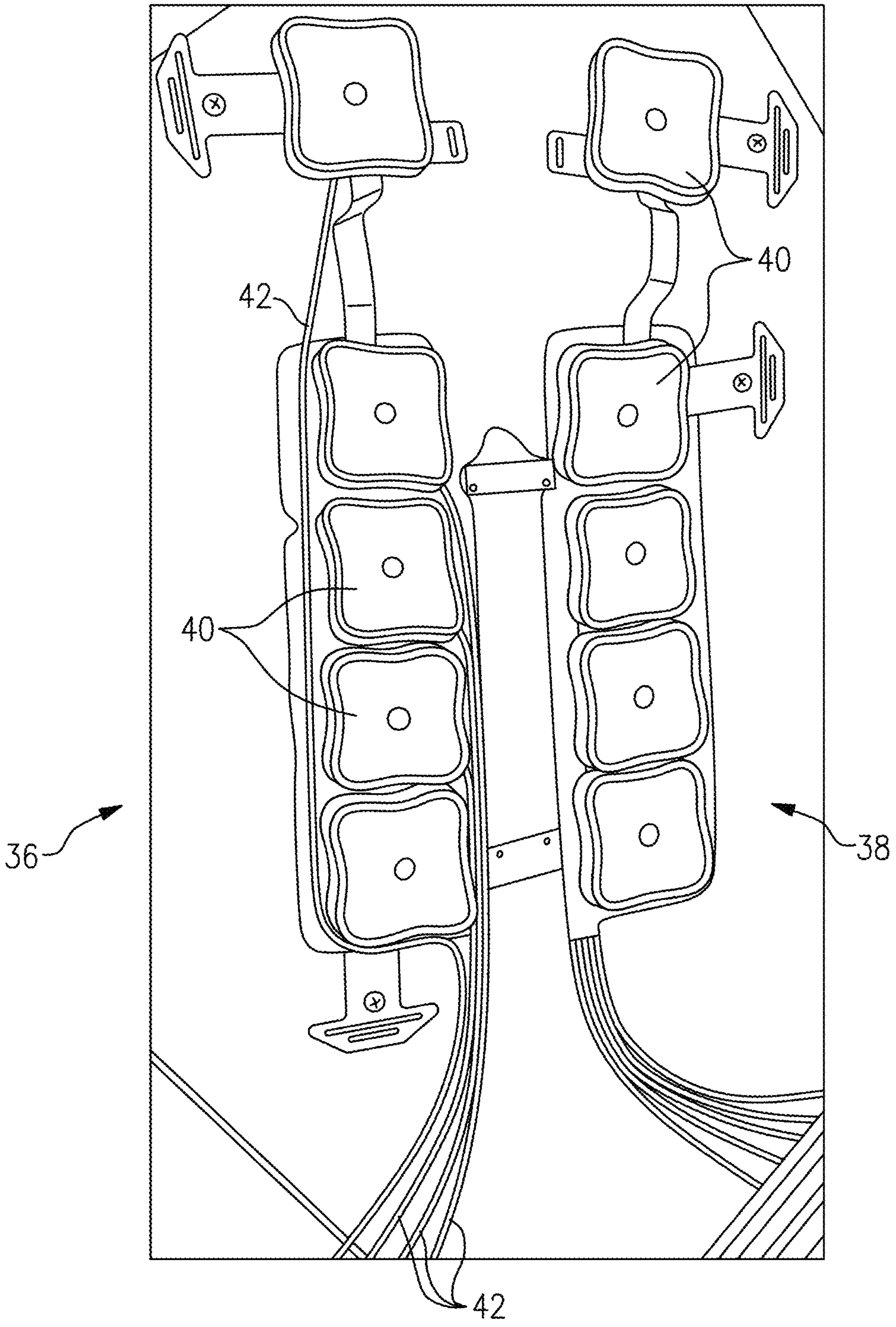
FIG. 2 illustrates a seat bladder system of the seat.

FIG. 2 illustrates a seat system 36 for incorporation into the seat 20. The seat system 36 includes a bladder system 38 that includes one or more inflatable bladders 40 and air conduits 42 in fluid communication with the bladders 40 for inflating and deflating the bladders 40. For instance, the air conduits 42 are laser-weldable tubes, such as thermoplastic urethane (TPU), which has good strength and flexibility, but polyamide (PA), polybutylene terephthalate (PBT), or acrylonitrile butadiene styrene (ABS) can alternatively be used to provide greater stiffness. The bladders 40 are formed from polymer films (e.g., TPU) that are selectively bonded together to form expandable cells. The bladders 40 are attached with a carrier 44, which includes one or more laser-weldable polymer film layers that may also be TPU.

The air conduits 42 are attached are in fluid communication with a valve bank (not shown). The valve bank is fluidly connected with one or more pumps. A processor is connected with the pump and valves, to open and close the valves to selectively provide air to the bladders 40 via the air conduits 42.

The air conduits 42 are affixed with the carrier 44 in order to maintain the passages 42 along a desired routing to the bladders 40 without interference from other components that may be assembled adjacent the seat system 36 in the seat 20. For instance, undue pressure applied to any of the conduits 42 may result in "pinching" the conduit 42 and hindering air flow to and from the bladders 40.

Figure 3:
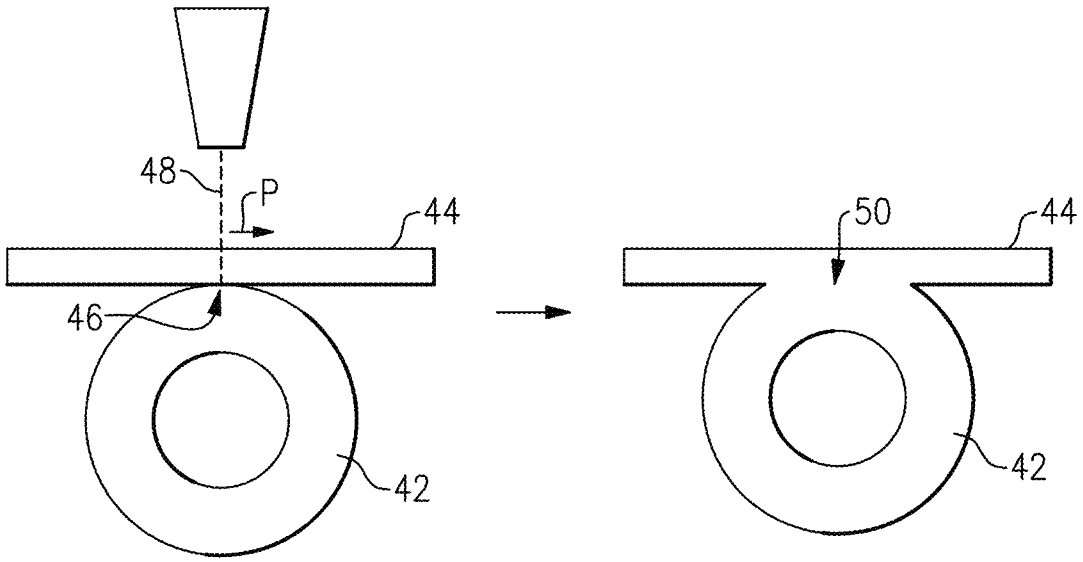
FIG. 3 illustrates a laser welding process for affixing a conduit to a seat inflatable bladder carrier.

FIG. 3 depicts an example method of affixing the conduits 42 to the carrier 44 in the seat system 36. For example, the method includes arranging the laser-weldable conduit 42 along a contact interface 46 with the carrier 44. The interface is the area over which the conduit 42 contacts the carrier 44.

Next, a laser beam 48 is directed at the carrier 44 and moved relative to the carrier 44 along a welding path P that intersects the contact interface 46. The carrier 44 is substantially transparent to the laser beam 48, which penetrates through the carrier 44 and impinges the conduit 42. Along the weld path P at the contact interface 46 the laser beam 48 causes rapid localized heating of the carrier 44 and the conduit 42, which causes localized melting in the carrier 44 and the conduit 42 that, upon solidifying, fuses the carrier 44 and the conduit 42 together in a weld 50 (FIG. 3).

Figure 4:
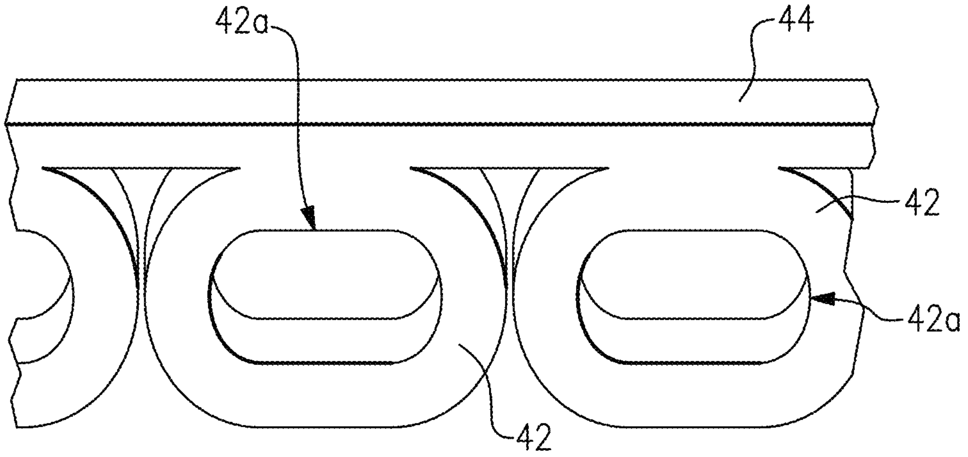
FIG. 4 illustrates a picture of several conduits laser-welded to a seat inflatable bladder carrier.

The conduits 42 may include an additive that makes the conduit 42 opaque, and thus absorbent, to the laser beam 48 at a wavelength that is used for the welding. The additive may be dispersed through the polymer of the conduit 42, or provided as a surface coating on the conduit 42. An example additive includes, but is not limited to, carbon black. The carrier 44 need not be perfectly transparent to the laser beam 48, as long as the nominal amount of laser absorption does not generate enough heat to melt the conduit 42 outside of the interface 46. As an example, 85% transmission or greater is considered to be transparent for purposes of this disclosure, and less than 85% is opaque. The wavelengths of the laser beam 48 may vary in dependence upon the type of polymer that the conduit 42 and carrier 44 are made of, as well as the type of additive, if used. As an example, the lasers beam 48 has a wavelength of 1000 nm to 2000 nm. FIG. 4 shows a sectioned view through several conduits 42 that have been laser-welded to the carrier 44.

For example, a "weld" is a region at which the carrier 44 and the conduit 42 are melt-fused together. The term "laser-weldable" refers to polymers that are capable of being welded together by laser welding, e.g., by melting and fusing. For example, the carrier 44 and the conduit 42 are made of the same polymer so that there is substantially uniform melting and fusing between the carrier 44 and the conduit 42. Different polymers may alternatively be used as long as both can be melted and fused together without significant thermal damage to the polymers or thermally-induced collapse of the conduit 42.

Figure 5:
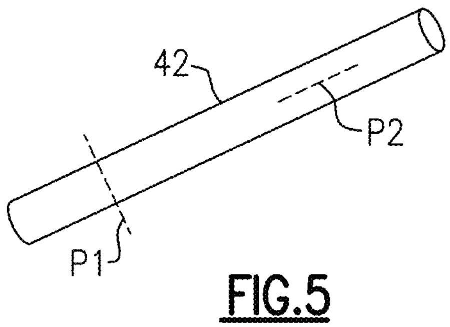
FIG. 5 illustrates example welding paths with respect to a conduit.

FIG. 5 shows examples of weld paths P1 and P2 relative to a conduit 42. Weld path P1 extends approximately perpendicular to the length direction of the conduit 42 (i.e., across an axial direction of the conduit 42), while weld path P2 extends approximately parallel to the length (axial) direction. For example, the weld path P1 may be used to weld a single conduit 42 or to weld across a gang of several conduits 42 that run adjacent each other and are otherwise laterally unjoined to each other, and weld path P2 may be used to weld a single conduit 42. The selected weld direction may also depend on the laser welding configuration. For instance, the laser is emitted through a pneumatic optic element that facilitates clamping the carrier 44 against the conduit 42. Such optic elements are known to those of ordinary skill in the art and can be spherical or cylindrical. A spherical shape produces a spot weld, while a cylindrical shape produces a line weld. The cylindrical shape facilitates producing a stronger weld for the P1 weld path.

Figure 6:
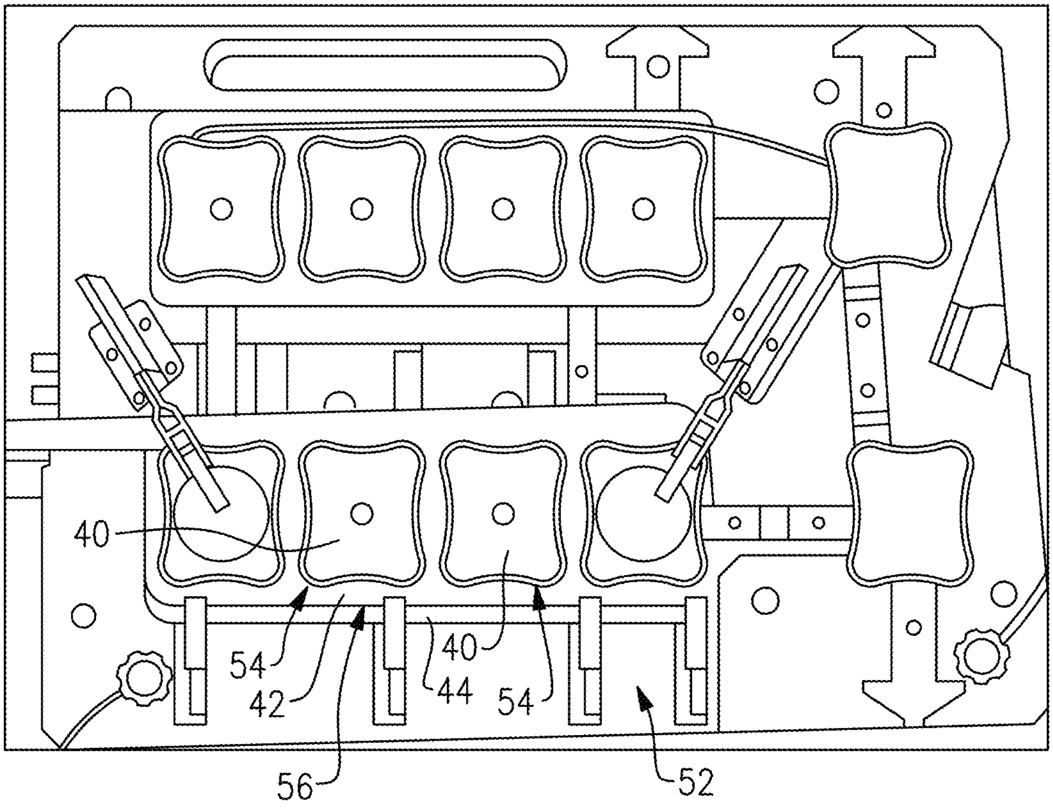
FIG. 6 illustrates a fixture holding the conduits and carrier for a welding process.

In a further example shown in FIG. 6, the carrier 44 and conduits 42 are arranged in a fixture 52. For instance, the fixture 52 includes cavities 54 in which the bladders 40 are received, and grooves 56 in which the conduits 42 are received. The conduits 42 may be fluidly connected to the bladders 40 either before or after the welding process, such as via connecting the conduits 42 to ports or other inlets of the bladders 40. The fixture 52 facilitates a proper positioning of the carrier 44 and conduits 42 for the welding process.

The laser-welding process does not require application of substantial pressure on the conduits 42 during weld processing. For instance, other welding techniques, such as ultrasonic welding, require application of pressure during the welding process. Such pressure, coupled with thermal softening of the conduit, can cause partial collapse of the conduit and concomitant reduction on the cross-sectional flow area of the airflow passage that runs through the conduit. In contrast, the laser-welding method is a low pressure process that avoids substantial collapsing of the conduits. As a result, the laser-welding enables the cross-sectional flow areas of the airflow passages through the conduits 42 to be maintained. For instance, as shown in FIG. 4, the conduits 42 have uncollapsed cross-sectional areas 42*a* that are substantially oval in shape. As a further example, the uncollapsed cross-sectional area 42*a* is characterized by the absence of any concave sides (concave inwardly into the passage). As a result, the laser-welded conduit 42 maintains its cross-sectional flow area, thereby facilitating efficient and rapid inflation and deflation of the bladders 40.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method, comprising:
- arranging at least one laser-weldable conduit along a contact interface with a laser-weldable polymer film layer of a seat inflatable bladder carrier; and
- directing a laser beam at the laser-weldable polymer film layer and moving the laser beam along a welding path that intersects the contact interface, the laser beam penetrating through the laser-weldable polymer film layer and impinging the at least one laser-weldable conduit, and along the welding path at the contact interface the laser beam causing localized heating and welding of the laser-weldable polymer film layer and the at least one laser-weldable conduit to each other.

2. The method as recited in claim 1, wherein the arranging includes securing the laser-weldable polymer film layer and the at least one laser-weldable conduit in a fixture.

3. The method as recited in claim 1, wherein the welding path is across an axial direction of the at least one laser-weldable conduit.

4. The method as recited in claim 3, wherein the welding path is along the axial direction of the at least one laser-weldable conduit.

5. The method as recited in claim 1, wherein the at least one laser-weldable conduit and the laser-weldable polymer film layer are formed of the same polymer.

6. The method as recited in claim 1, wherein the at least one laser-weldable conduit and the laser-weldable polymer film layer are formed of TPU.

7. The method as recited in claim 1, wherein the at least one laser-weldable conduit and the laser-weldable polymer film layer are formed of a polymer selected from the group consisting of TPU, PBT, ABS, and PA.

8. The method as recited in claim 1, wherein the seat inflatable bladder carrier includes at least one inflatable bladder.

9. The method as recited in claim 1, further comprising fluidly connecting the at least one laser-weldable conduit to an inflatable bladder on the laser-weldable polymer film layer.

10. The method as recited in claim 1, wherein the at least one laser-weldable conduit includes an air passage that comprises an uncollapsed cross-section at at least one laser-welded joint, and the uncollapsed cross-section comprises an oval shape.

11. The method as recited in claim 10, wherein the uncollapsed cross-section does not have any concave sides.

12. The method as recited in claim 1, wherein the at least one laser-weldable conduit includes a plurality of laser-weldable conduits that run adjacent each other and are laterally unjoined to each other.

13. An article, comprising:

a seat inflatable bladder carrier including a laser-weldable polymer film layer and at least one inflatable bladder carried on the laser-weldable polymer film layer; and at least one laser-weldable conduit attached along at least one laser-welded joint to the laser-weldable polymer film layer, the at least one laser-weldable conduit including an air passage fluidly connected with the at least one inflatable bladder, the air passage having an uncollapsed cross-section at the at least one laser-welded joint.

14. The article as recited in claim 13, wherein the uncollapsed cross-section has an oval shape.

15. The article as recited in claim 13, wherein the uncollapsed cross-section does not have any concave sides.

16. The article as recited in claim 13, wherein the at least one laser-weldable conduit and the laser-weldable polymer film layer are formed of a common polymer selected from the group consisting of TPU, PBT, ABS, and PA.

17. The article as recited in claim 13, wherein the at least one laser-weldable conduit includes a laser-absorbent additive.

* * * * *